(12) United States Patent
Brackertz et al.

(10) Patent No.: US 11,295,330 B2
(45) Date of Patent: Apr. 5, 2022

(54) PRICE RULE INTEGRATED COMPARISON ENGINE

(71) Applicant: Aurelis Consulting Sp. z o.o., Warsaw (PL)

(72) Inventors: Stephan Andreas Brackertz, Warsaw (PL); Mathieu Christian Daniel Ollier, Utrecht (NL)

(73) Assignee: AURELIS CONSULTING SP. Z O.O., Warsaw (PL)

( * ) Notice: Subject to any disclaimer, the term of this patent is extended or adjusted under 35 U.S.C. 154(b) by 141 days.

(21) Appl. No.: 16/380,061

(22) Filed: Apr. 10, 2019

(65) Prior Publication Data

US 2020/0327568 A1    Oct. 15, 2020

(51) Int. Cl.
*G06Q 30/02* (2012.01)
*G06Q 10/06* (2012.01)

(52) U.S. Cl.
CPC ....... *G06Q 30/0206* (2013.01); *G06Q 10/063* (2013.01); *G06Q 30/0205* (2013.01); *G06Q 30/0283* (2013.01)

(58) Field of Classification Search
None
See application file for complete search history.

(56) References Cited

U.S. PATENT DOCUMENTS

| 2008/0126264 | A1* | 5/2008 | Tellefsen | G06Q 10/04 705/80 |
| 2010/0332355 | A1* | 12/2010 | Lopez | G06Q 10/06313 705/27.1 |
| 2012/0303412 | A1* | 11/2012 | Etzioni | G06Q 30/06 705/7.31 |
| 2013/0159065 | A1* | 6/2013 | Fawcett | G06Q 10/06 705/7.36 |

FOREIGN PATENT DOCUMENTS

| CN | 1826618 A | * 8/2006 | ......... G06Q 30/0203 |
| IN | 3643/MUM/2011 | * 12/2011 | |

OTHER PUBLICATIONS

John A. Keane et al., A Computational Framework for Location Analysis, Sep. 2002, IEEE Transactions on Systems, Man, and Cybernetics—Part A: Systems and Humans, vol. 32, No. 5. (Year: 2002).*

Nathalie Cassaigne et al., Intelligent Decision Support for the Pricing of Products and Services in Competitive Consumer Markets, Feb. 2001, IEEE Transactions on Systems, Man, and Cybernetics—Part C: Applications and Reviews, vol. 31, No. 1. (Year: 2001).*

* cited by examiner

*Primary Examiner* — Jerry O'Connor
*Assistant Examiner* — Matthew H Divelbiss
(74) *Attorney, Agent, or Firm* — Maier & Maier, PLLC

(57) ABSTRACT

A pricing engine may be provided for automatically setting pricing or repricing of goods simultaneously according to a set of rules and objectives. The pricing engine may utilize a database of internal data and external data. The pricing engine may use the data to segment the goods. The engine may further apply pricing rules to the segmented goods, reconcile any deviations using a control framework, and provide a comprehensive output.

14 Claims, 9 Drawing Sheets

PRICE RULE INTEGRATED COMPARISON ENGINE

BACKGROUND

The emergence of automobiles sparked a number of spin-off industries including the automotive parts industry. Spare parts are offered by automakers and original equipment manufacturers (OEM) themselves in addition to strictly aftermarket parts providers. One difficulty for the international spare parts industry is to maintain a consistent pricing scheme across many parts (in some cases hundreds of thousands or millions of SKUs) that can be implemented and monitored across international markets.

The ability to logically and consistently price a multitude of spare parts in relation to each other and over a number of different countries at the same time may be desirable by OEMs and other spare parts manufacturers and retailers. However, these entities may struggle to rationalize a pricing logic that effectively creates rational and consistent prices across different parts and spans multiple competitive marketplaces, economies, and even countries. Therefore, it may be desirable to have a pricing engine capable of implementing and rationalizing a pricing logic within part groups and across multiple marketplaces, economies, and countries.

SUMMARY

According to an exemplary embodiment, a price rule integrated comparison engine may be provided for automatically setting pricing or repricing of goods simultaneously according to a set of rules and objectives. The pricing engine may utilize a database of part data. The pricing engine may use the data to segment the goods. The engine may further apply pricing rules to the segmented goods, reconcile any deviations using a control framework, and provide a comprehensive output.

According to an exemplary embodiment, a non-transitory computer-readable medium having instructions stored thereon that, when executed on a processor, facilitate the pricing of parts may be provided. The computer-readable medium may have instructions stored thereon that, when executed on a processor, perform the following steps. The computer-readable medium for pricing may access a part database having at least one of internal part data and external part data. Using the data, the parts may be segmented into unique competitive segments. A pricing rule may be applied to set a target price for at least one of an individual part, part segment, and all parts. A control framework may be implemented to establish a tolerance band of maximum pricing deviation from the target price. Target prices falling outside of the tolerance band may be automatically adjusted by the control framework to be within the tolerance band. A report may then be generated for presenting the financial impact of the pricing and a rule book defining the parameters used in the pricing may be created.

According to an exemplary embodiment, a method for pricing parts may be provided. The method may include accessing a part database having at least one of internal part data and external part data. Using the data, the parts may be segmented into unique competitive segments. A pricing rule or multiple pricing rules may be applied to set a target price for at least one of an individual part, part segment, and all parts. A control framework may be implemented to establish a tolerance band of maximum pricing deviation from the target price. Target prices falling outside of the tolerance band may be automatically adjusted by the control framework to be within the tolerance band. A report may then be generated for presenting the financial impact of the pricing and a rule book defining the parameters used in the pricing may be created.

BRIEF DESCRIPTION OF THE FIGURES

Advantages of embodiments of the present invention will be apparent from the following detailed description of the exemplary embodiments. The following detailed description should be considered in conjunction with the accompanying figures in which.

Exemplary

Exemplary

Exemplary

Exemplary

Exemplary

Exemplary

Exemplary

Exemplary

Exemplary

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter.

In addition, for each of the embodiments described herein, the corresponding form of any such embodiment may be described herein as, for example, "a computer configured to" perform the described action.

A price rule integrated comparison engine method and platform may be provided for uniformly integrating data to automatically generate consistent pricing determinations for parts or products and to monitor for and automatically correct pricing discrepancies. The platform and method may be utilized to set pricing for new parts or to adjust pricing for parts already existing in the marketplace. The terms "part", "spare part", "part number", "P/N", "PN", "item", "product", and "unit" may be used interchangeably herein to represent a subject of the pricing automation method and platform.

Figure 1:
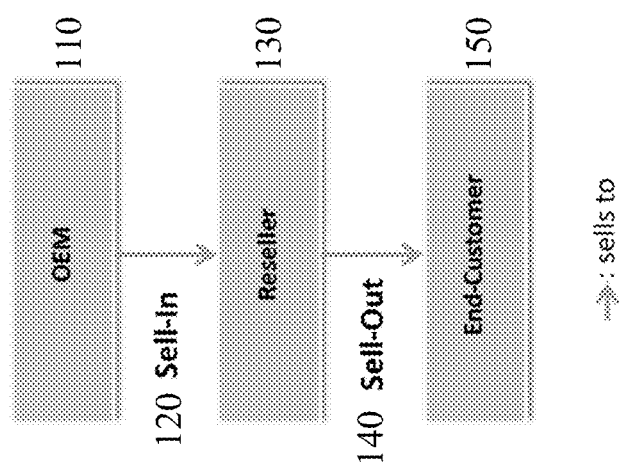
FIG. 1 shows a parts distribution flowchart.

Now referring to exemplary FIG. 1, a flow chart showing a product sale cycle may be provided. A product may be manufactured by an OEM 110 and sold to a reseller 130. The sale of a part from the OEM to a reseller may be termed "sell-in" 120. Reseller 130 may include an authorized repair technician, workshop, parts retailer, dealership, or other entity as would be understood by a person having ordinary skill in the art. The reseller 130 may then sell the part to an end-customer 150. The sale from a reseller to an end-customer may be termed "sell-out" 140.

Figure 2:
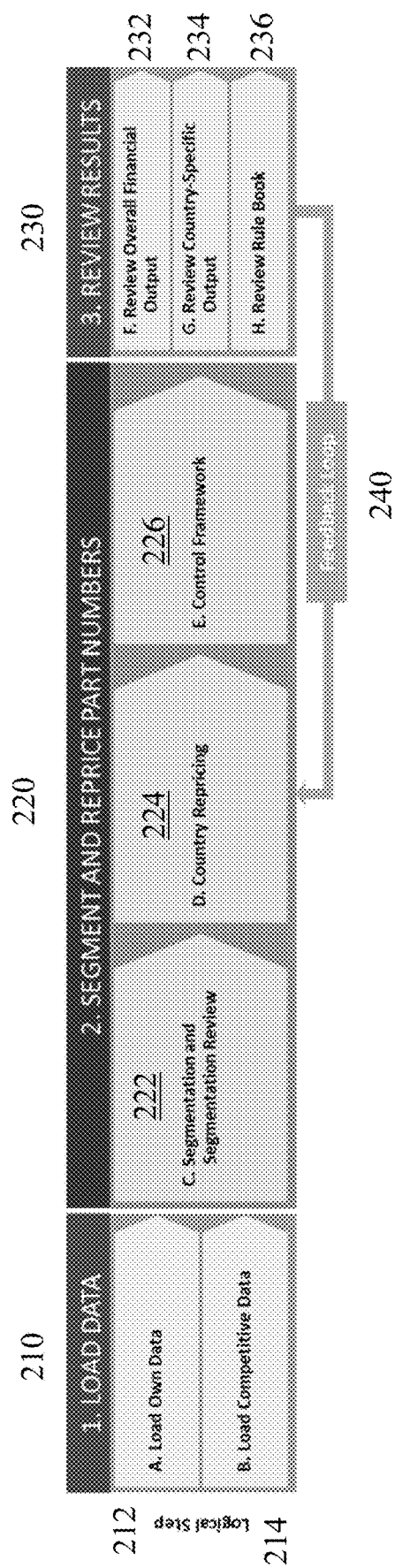
FIG. 2 shows a price rule comparison engine flowchart.

Now referring to exemplary FIG. 2, a flow chart showing the automated price setting and adjustment for a part may be provided. First, data may be gathered, prepared, formatted and uploaded to at least one database 210. The data may be associated with specific parts or categories of parts. The data may include own data 212, which may include internal sales data related to the subject part. The internal data may include, for example, sales, price, cost, age, supplier, vehicle application, exterior dimensions, weight, technical features or characteristics, etc. The data may also include competitive data 214, which may include external sales data related to the subject part. The external data may include, for example, competitor prices, peer OEM prices, market share, or variables describing a level of competition, etc. Next, the data may be segmented and a price may be set or adjusted 220. Uploaded data for each part may be analyzed by the platform. Each part may then be allocated to a unique competitive segment 222, which may be used for pricing purposes. Furthermore, the repricing may be performed on a country-specific basis 224. A pricing dashboard may present pricing for each part number on a country-specific basis. Pricing rules may be implemented through the dashboard and the effects of pricing rules and repricing may be visually displayed for each part number individually and/or for all part numbers together. A control framework 226 may be utilized to compare and control price deviations across marketplaces and countries. For example, parts that are sold across multiple markets or countries that have different prices in different markets may be displayed. The control framework 226 may be utilized to define tolerance bands, which may set a maximum deviation across markets and/or countries for a particular part. This may prevent third parties from capitalizing on price discrepancies through arbitrage. Once the parts have been segmented and repriced, the results may be reviewed 230 on an overall financial output 232 basis and/or a country-specific basis 234. The platform may run the results on a simulation basis such that the financial impact can be displayed prior to implementation. The simulation results may be displayed in detail for each respective country and for each respective part. The displayed results may present any combination of country and/or part, as would be understood by a person having ordinary skill in the art. The rules utilized in a simulation may be stored and accessible, for example when reviewing simulation results. The rules may include algorithms and rules for pricing each item. The platform may create a rule book file 236, which may include the rules in a desired format for internal and/or external communication purposes. The rule book 236 may optionally include the pricing rules in an easy-to-read and/or summarized format. The platform may automatically run additional simulations by repricing parts for particular countries using a feedback loop 240. The simulations may be performed continuously, a limited number of times, or until a desired target or optimal result is reached.

Figure 3:
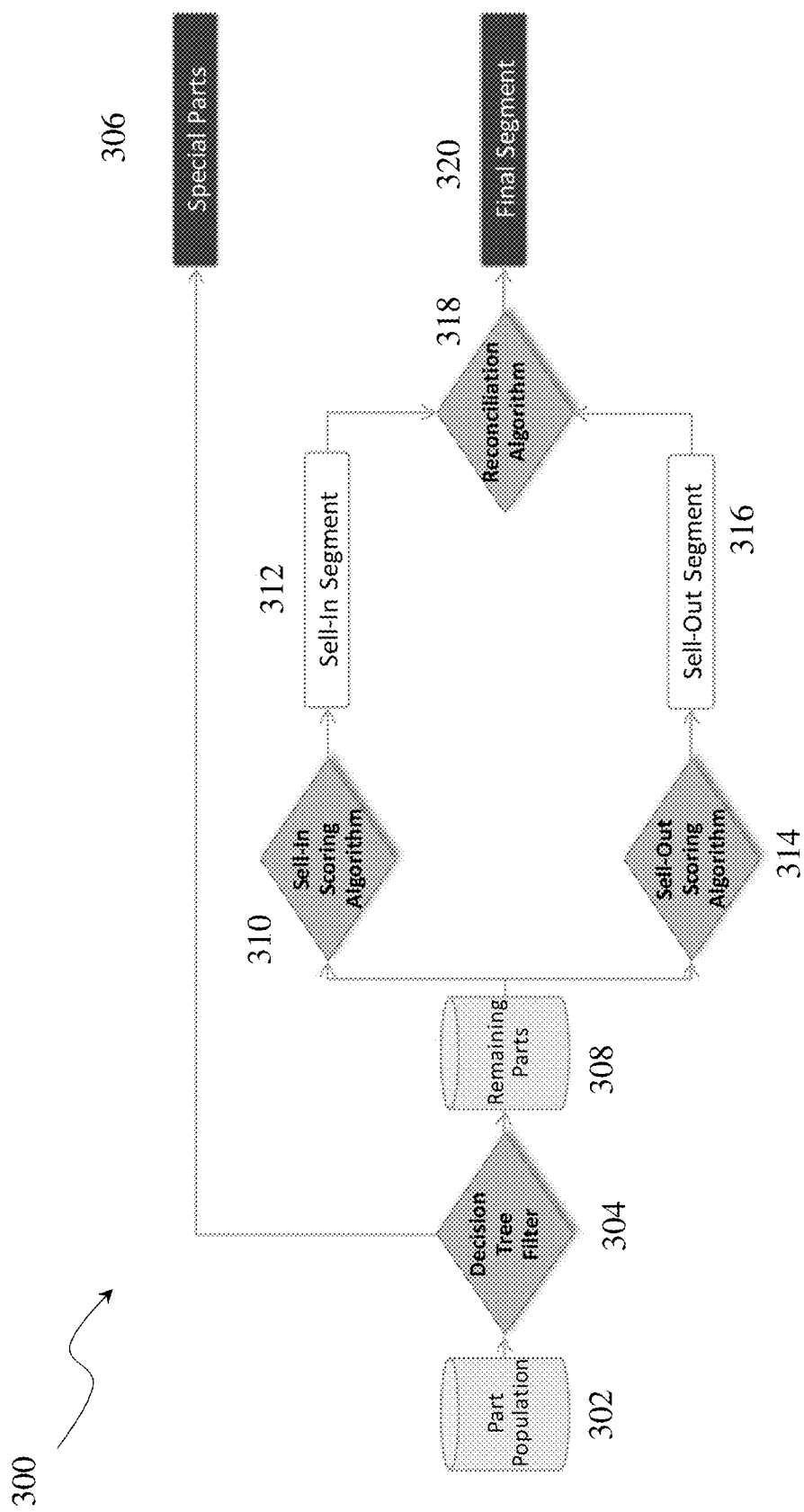
FIG. 3 shows a pricing engine segmentation flowchart.

Now referring to exemplary FIG. 3, a segmentation logic process 300 may be provided. Segmentation process 300 may create segments, or clusters, of parts. Parts may be segmented based on similar market characteristics and/or competition levels. First, all parts may be populated in a part population pool 302. An initial decision tree filter 304 may be used to filter out special parts 306 that may not logically belong with the rest of the assortment. These special parts 306 may include, but not be limited to, parts that are manufactured in joint venture constellations, parts used for insurance ratings, parts for new technologies such as hydrogen vehicles, government mandated safety relevant parts, out of production parts, and other special parts as would be understood by a person having ordinary skill in the art. Users of the analysis platform may be free to select and code special parts according to their needs. Special parts may be marked or "flagged" in a database to be treated in a special way with special price rules. The segmentation may be carried out automatically based on characteristics of each part number. The segmentation may optionally be reviewed and manually adjusted. The remaining parts 308 may be further segmented. Each remaining part may be assessed for at least competitiveness and market situation. These assessments may be made for multiple points in the part's lifecycle. For example, each part may be assessed at the sell-in level 310 in order to allocate each part to a unique sell-in segment 312 and at the sell-out level 314 to allocate each part to a unique sell-out segment 316. Once determined, the sell-in and sell-out segments for each part number may be compared. In an exemplary embodiment, a reconciliation algorithm 318 may determine an appropriate final segment 320 for the part allocation based on the sell-in and sell-out segment determinations. The segmentation process may result in each part number being allocated a unique segment. According to an exemplary embodiment, a part number may not simultaneously belong to multiple segments. According to some further exemplary embodiments, segmentation may be implemented using a single segmentation algorithm, which may incorporate all relevant data and factors. The single algorithm segmentation may not require a reconciliation algorithm because the parts may not be split to separately analyze sell-in and sell-out considerations during segmentation.

Figure 4:
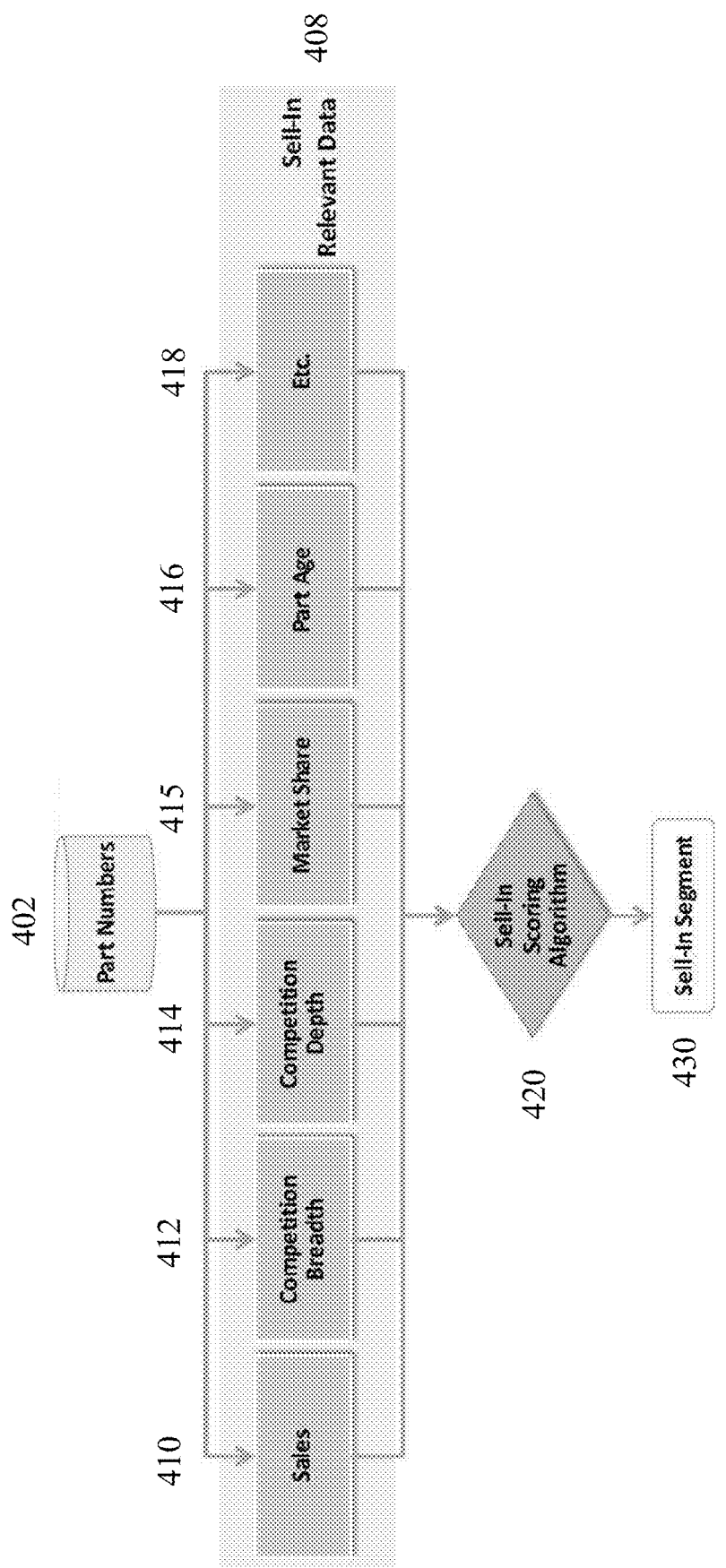
FIG. 4 shows a pricing engine sell-in segmentation flowchart.

Now referring to exemplary FIG. 4, a wireframe of a sell-in scoring algorithm and segmentation process may be provided. The sell-in scoring algorithm may use sell-in relevant data 408 for each part number, provided in a part number database 402, in order to assign each part number to a sell-in segment according to a defined logic. Parts that belong to the same sell-in segment may face a similar level of sell-in competition. The sell-in scoring algorithm may use a number of data points, such as, but not limited to, sales 410 (in units and/or in value), competition breadth 412, competition depth 414, market share 415, part age 416, and other relevant data points 418, as would be understood by a person having ordinary skill in the art. The sell-in relevant data 408 may be entered into or automatically processed by a sell-in scoring algorithm 420, which may output a sell-in segment 430 for each part number.

Figure 5:
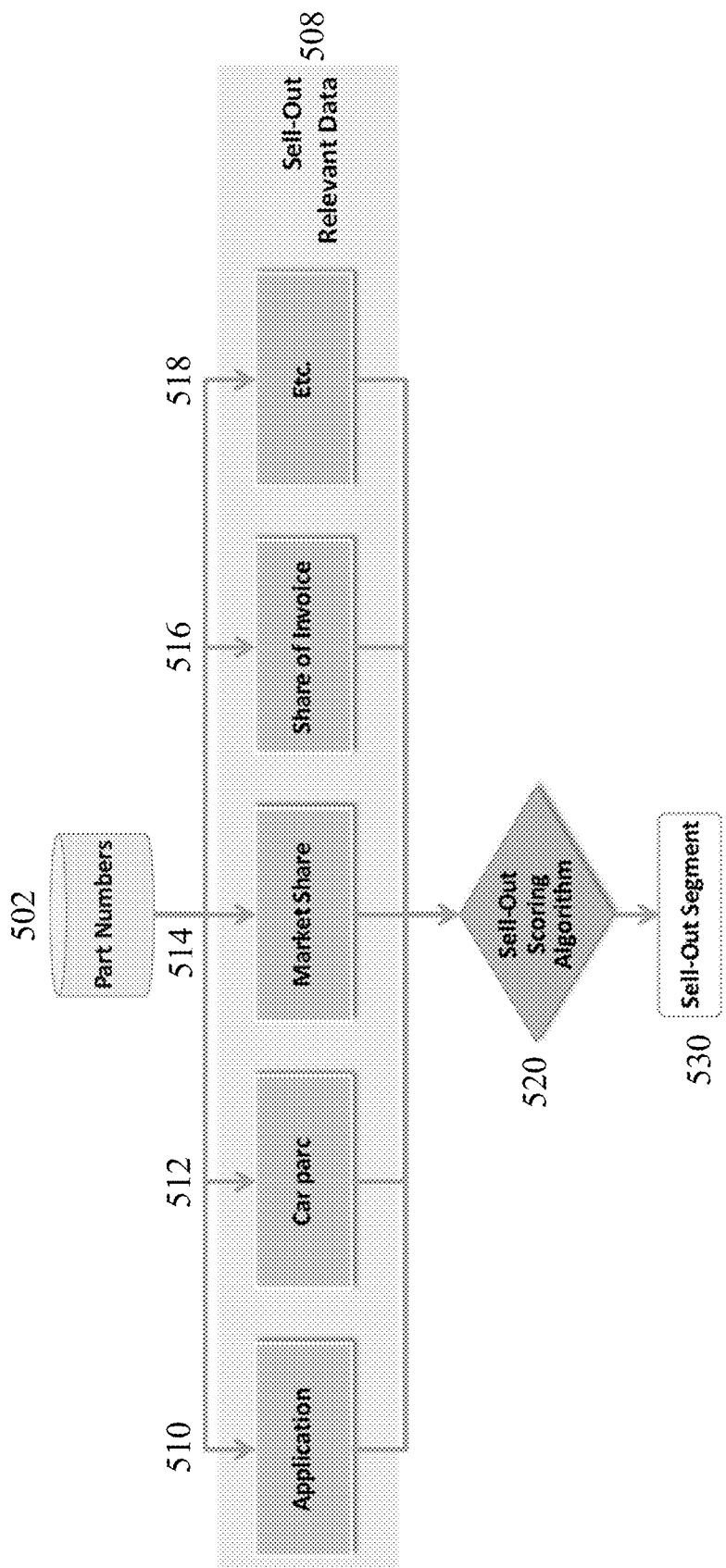
FIG. 5 shows a pricing engine sell-out segmentation flowchart.

Now referring to exemplary FIG. 5, a wireframe of a sell-out scoring algorithm may be provided. The sell-out scoring algorithm may use sell-out relevant data 508 for each part number, provided in a part number database 502, in order to group each part number according to a defined logic. Part number database 502 may be the same database as part number database 408, according to some exemplary embodiments. Parts that belong to the same sell-out segment may face a similar level of sell-out competition. The sell-out scoring algorithm may use a number of data points, such as, but not limited to, part application 510, car parc 512, market share 514, share of invoice 516, and other relevant data points 518 as would be understood by a person having ordinary skill in the art. Car parc 512 may refer to the number of or all registered vehicles within a defined geographic region. The sell-out relevant data 508 may be entered into or automatically processed by a sell-out scoring algorithm 520, which may output a sell-out segment 530 for each part number.

According to an exemplary embodiment, a part may only be allocated to one unique segment, allowing a specific algorithm to be used to compare the output of the sell-in and the sell-out algorithms. According to other exemplary embodiments, a part may be assigned to more than one segment. The sell-in, sell-out comparison algorithm may make an arbitrage in case the sell-in and sell-out algorithms diverge. Divergence may occur, for example, when a part faces more sell-in than sell-out competition or vice versa. The arbitrage or reconciliation algorithm may consider data characteristics, such as the robustness of the data used in the segmentation process. As market situations evolve, the output of the segmentation process or algorithm may also change over time for any particular part number. For example, over extended periods of time, parts may "drift" from one competitive segment to another. In the segmentation process, the platform may implement rules to manage the reconciliation of sell-in and sell-out segmentation to a final segmentation for a part. The rules may optionally be set by a platform user. In the algorithm each part may receive a sell-in score based on attributes in the database; each part may also receive a sell-out score based on the attributes in the database. According to an exemplary embodiment, a relative ratio of the sell-in to the sell-out score may determine the overall segmentation score. It should further be noted that segmentation may be performed universally for all countries, separately by country, or in a single segmentation that may contain country considerations as part of the input variables to the segmentation.

The scoring of attributes may not have a required format, according to some exemplary embodiments, may typically utilize numbered scoring. Scores used in the algorithms may typically be positive numbers; however, scores may not be restricted to positive numbers. In some embodiments, negative scores may be utilized. In an exemplary embodiment utilizing numbered scoring, the scale of the scores may begin at zero, representing the lowest conceivable value of a variable. For example, zero sales may be rated as a score of 0; no sell-in competition at all may be rated as a score of 0; no sell-out competition may be rated as a score of 0; and no market share at all may be rated as a score of 0. The maximum score for a variable may typically be set on a scale of 100. A 100, or maximum score, for a specific attribute or variable may be set to equate to the maximum value that has been found across all parts for which data is available (which may include current data and historical data of the OEM, or even current and historical data of the entire spare parts industry). For example, a market share of 100% can be set as 100. Similarly, if the greatest number of units sold of all SKUs of a manufacturer is 59.6 million then 59.6 million may be scaled or set to a 100 for purposes of attribute scoring.

In some embodiments, each variable may have a unique maximum value score. While it is not mandatory, variables may be re-scaled so that their maximum scores are more easily comparable, such as the example above based on a 0-100 scale. In some further exemplary embodiments, the range of potential values actually found in practice, as well as relative importance of factors to each other may be accounted for in the re-scaling, as would be understood by a person having ordinary skill in the art. For example, if two variables are considered equally important, they may both be implemented on a scale of 0 representing the lowest value and 100 representing the highest value. If variable B were considered twice as important as variable A, then variable A could be scaled from 0 to 100 and variable B could be scaled from 0 to 200. According to some exemplary embodiments, variables may be scaled using percentiles of the mathematical Pareto distribution of each variable first, and then re-scaled or adjusted based on their relative importance. While the determination of importance in relative factors may be subjectively set or input by user input in some embodiments, an exemplary embodiment of the platform may utilize algorithms to automatically scale the variable ratings based on certain rules and inputs. Variable ratings and scaling may be pre-set and/or stored for future use. It may be useful to keep the scoring rating constant over time (i.e. once set, it may be beneficial to keep constant for several years unless the market dramatically changes). Therefore, in some embodiments, certain rules and restrictions for adjusting the ratings and scaling may be set.

For example, a part may receive a sell-in score of 100 (50 points for having much sell-in competition, 50 points for being a part predominantly for vehicles older than 5 years), where higher scores mean more competition. Based on this score it would be placed in an "upper competitive" segment by the sell-in segmentation algorithm. That same part may receive a sell-out score of 200 (25 points for being very bulky and heavy, 25 points for being a high technology item, 50 points for prices being highly relevant to customers, 40 points for a low market share, 60 points for a high degree of sell-out competition with low prices), where higher scores mean more competition. Based on this score it would be placed in the "top competitive" segment by the sell-out segmentation algorithm. The reconciliation algorithm may analyze the ratio of 200 points in sell-out score vs. 100 points in sell-in score and then assign the part to a "top competitive" segment overall since the points ratio is heavily skewed towards sell-out. However, according to an exemplary embodiment, additional pricing rules may be coded in the segmentation, which may allow overriding of the algorithm scoring for individual parts. Exemplary pricing rules may include "if then ... else" statements, as would be understood by a person having ordinary skill in the art. For example, a part with the 200 sell-out and 100 sell-in score may still be placed into an "upper competitive" segment rather than a "top competitive" segment if there is a flag in the database that market share information is not accurate or older than 2 years.

Figure 6:
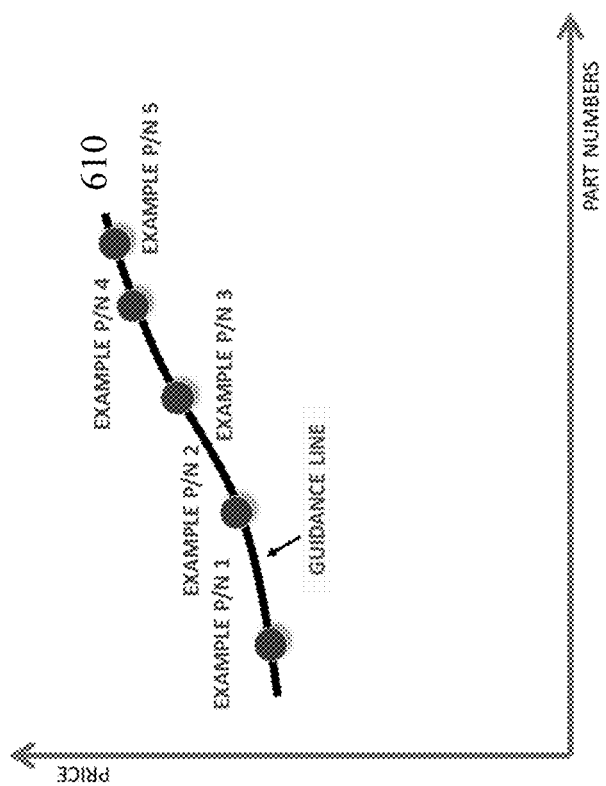
FIG. 6 shows a pricing engine guidance line.

Now referring to exemplary FIG. 6, a guidance line element may be provided. The guidance line may describe the current or future desired/target mathematical relationship or link among all parts of an assortment. A guidance line 610 may provide a reference or guidance price for any given part number based on intrinsic characteristics of the part. The guidance line formula may be based on characteristics including, but not limited to, part technical features (e.g. heated/non heated, LED/Xenon/Halogen technology, HD/Ultra HD, 3D capable or not, camera resolution, etc.), part dimensions (height, weight, diameter, etc.), part application (vehicles or products with which it is used), prices of competition, intensity and composition of competition, dynamics of the market, historical price levels for the part, value perceived by a customer, and other characteristics as would be understood by a person having ordinary skill in the art. The guidance price may be calculated for any given part number. When graphed together on a chart, the guidance prices for all part numbers may provide a visual representation of the guidance line as well as an illustration of the price relationship among all parts of the assortment. A guidance line may facilitate capturing and displaying a pricing rule that is applied or implemented by or through the pricing platform. Guidance lines may be highly useful to ensure logical pricing consistency, manipulate prices of many parts in a short amount of time, and to determine prices for newly created part numbers that may not yet have a price.

According to an exemplary embodiment, the guidance line may be graphed such that the part numbers are sorted by different variables, such as increasing price, increasing customer perceived value, or increasing market share, which may result in a line of flat or inclining nature. As explained herein, the guidance line shape may be adjusted or tilted, for example, an inclining curved guidance line may be tilted down to achieve a desired relationship of pricing among the parts in a segment. The relationship may be calculated and extracted as a mathematical formula. The ability to rotate, tilt, deform or freely shape the guidance line may allow many part numbers to be manipulated in a fast and easy way in order to achieve a desired relationship between the parts and their prices. Once a guidance line has been initially set or defined, the guidance line and its shape may evolve over time as certain parameters for its calculation may change. For example, market dynamics, part characteristics and other data parameters may change over time, leading to evolution of the guidance line. Therefore, the guidance line may need to be recalculated and/or updated on a regular basis. According to some exemplary embodiments, artificial intelligence and/or machine learning may be used to define an optimal guidance line, including its shape and how it may be updated over time. A guidance line may constitute a supporting tool in the pricing process. A pricing platform may apply prices to part numbers as suggested by the mathematical formula of the guidance line or may apply further manipulations or calculations "on top" of the guidance line to arrive at individual parts prices.

As an exemplary implementation, a very simple guidance line for a front hood (bonnet) may be described mathematically as [Price of Front Hood]=[Supplier Sourcing Cost in US$]×2.4. A more sophisticated guidance line may be [Price of Front Hood]=$100+$2.5×[Weight of Hood]+$0.25×[Surface Area of Hood]+$20×[Variable indicating vehicle segment]. The variable indicating vehicle segment may, for example, be 1=economy car, 2=compact car, 3=midsize car, etc. Variables may not be restricted to physical characteristics of a spare part. Variables may also include customer perception of value, willingness to pay, visibility to the public opinion, and other variables as would be understood by a person having ordinary skill in the art.

Some complex guidance lines may include polynomial terms such as squares, cubes, logarithms, etc. The appearance of a guidance line may only be limited by the ability to describe the relationships mathematically. In practice, guidance lines may balance accuracy, complexity, and computing resources required to perform calculations. An exemplary embodiment may automatically suggest alternatives for a guidance line and may recommend a most appropriate formula.

The guidance line implementation, paired with pricing rules may allow for more rational, consistent and logic-based pricing, which may greatly improve customer perception of proposed prices. The use of mathematical relationships between part content/part value and price may greatly facilitate consistent pricing of thousands of part numbers. Mathematical formulas presented herein as examples of the guidance line may demonstrate this consistency. For example, using the medium complexity example provided earlier: the bigger and heavier a front hood is, the greater its price may be. Therefore, the bigger the vehicle the front hood fits onto the greater its price may be.

A user may have the option of applying prices suggested by a guidance line or overriding and further manipulating the guidance line and set prices. The guidance line may not be limited to describing the current relationship of part numbers to prices, but may also be used to generate a target relationship between part numbers and prices (for example, where there is currently a poor relationship or an inadequate relationship of features to prices). Furthermore, a target guidance line may be generated based on a target or desired future price relationship among parts rather than being set or based on an existing relationship and additional price parameters. A target guidance line may be created based on algorithms implemented by the pricing tool or may optionally be created and/or entered into the tool by a user. In some embodiments, a target guidance line may be uploaded or communicated from an external source or compatible software module.

A pricing rule or set of pricing rules may be used to achieve a target price for an assortment based on the data generated from the segmentation and guidance algorithms. The pricing rule may aim to define a price difference between an assortment that is being repriced and a relevant benchmark for that assortment. According to some exemplary embodiments, relative benchmarks may include competitor prices, peer prices, artificial references created, and other benchmarks as would be understood by a person having ordinary skill in the art. An exemplary pricing rule may be, for example, "set prices 15% above independent workshop prices." Another exemplary pricing rule may be, for example, "set prices on par (=0%) compared to the average of the top 3 OEM competitors." Pricing rules may be created using mathematical language and may range in complexity from simple to complicated. The platform may provide pre-defined rules to select for operation of the pricing generator. In some exemplary embodiments, the platform may also allow a user to customize and/or create a new pricing rule. An exemplary rule may optionally include for which part(s) it applies. The part identification may be a part number. An exemplary rule may optionally include which price level is being priced. The price level may be actual customer transaction price, recommended retail price, dealer net price, dealer net net price (dealer net price minus applicable rebates), or other price levels as would be understood by a person having ordinary skill in the art. An exemplary rule may optionally include a relative reference to which the price should be set. A relative reference may include OEMs, aftermarket competitors, and/or technical features. An exemplary rule may further optionally include which competitors should be used, if competitors are selected as the relative reference. For example, the platform may allow for benchmark competitors to be selected by name or other factors. Another element an exemplary rule may optionally include is the desired price position relative to the reference selected. For example, the rule could be set for a +8% price position, a −10% price position or any other desired price position. A pricing rule may also optionally include an element to define how outliers may be treated. For example, the platform may be set to automatically eliminate large deviations, to keep minimum profit margin rules, or to not allow the price difference compared to the current price from exceeding a desired pre-set percentage X %. A pricing rule may be defined for each competitive segment and each country. The same pricing rule or different pricing rules may optionally be set for multiple segments. The pricing rule may be defined according to objectives of the re-pricing process. In some exemplary embodiments, pricing rules may optionally be coded using, for example, "if . . . then . . . else" statements, or other coding statements understood in the art, and may range from simple statements to complex rule frameworks. Once pricing rules have been defined a pricing or re-pricing process may be run quickly and efficiently in future time periods and may allow intelligent and responsive pricing to be highly or fully automated.

Figure 7:
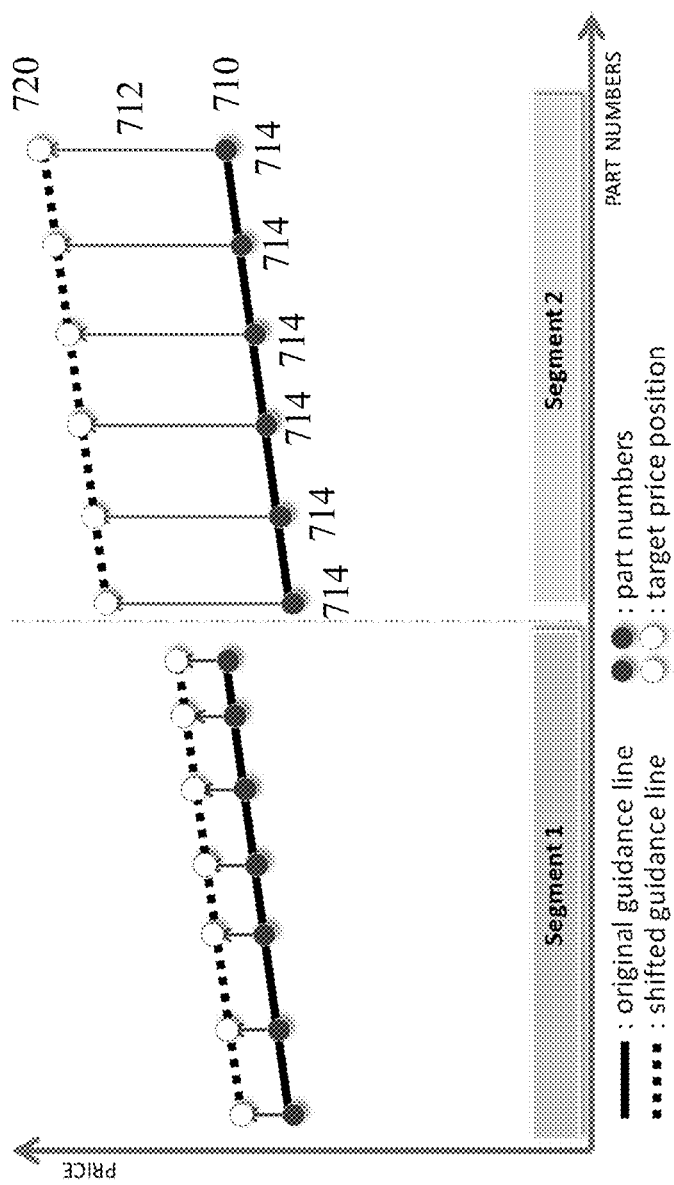
FIG. 7 shows a pricing engine guidance line adjustment.

Now referring to exemplary FIG. 7, the selected pricing rules may influence the guidance line 710. Depending on the pricing rules that are selected, the guidance line may be shifted to a more appropriate position or the position that best fits the pricing rule. The shift 712 may be a translation or a rotation. However, the guidance line shape may remain constant during this process. Once a guidance line has been shifted, its new position, or the shifted guidance line 720, may become the target price position for the parts in the applicable assortment(s). It may optionally be possible to allow deviations form the guidance line for any individual part numbers 714. It may also be possible to limit a price change for any part number. By establishing and shifting a guidance line to achieve a target price position for an assortment, the price position of the assortment may respect the selected pricing rule since the guidance line has shifted based on the pricing rule, yet the existing relationship among all parts may remain constant since the shape of the guidance line curve does not change. Rules used for each country and segment may be stored automatically and documented in the rule book.

As noted above, deviations from the guidance line may be permitted. Deviations may optionally be permitted on an individual or group basis. The target price position, which may be set as detailed above, may allow positioning of all parts in a product line. The positioning may be used to optimize the average of all parts or a weighted average, since it is possible to fulfill rules for all individual parts simultaneously by only moving the guidance line. The platform may allow a user to select an individual deviation option, which may allow individual part numbers to deviate form the guidance line, but still be priced using the same pricing rules selected. This may allow every individual part number to be priced by exactly fulfilling the pricing rule. This may allow a user to balance the need for consistency by forcing parts to follow the guidance line perfectly and part specific market factors by allowing individual parts to be priced freely. The platform may further provide for selection of "ranges" or "bounds" around the guidance line, within which part prices may be permitted to fluctuate. For example, a user may select a rule that all parts must follow the guidance line within plus or minus 10% deviation. The guidance line may be calculated first. Next, individual part prices may be calculated with a set of pricing rules. Finally, there may be a reconciliation where the guidance line acts as an anchor of a "collar." The pricing tool platform and method may further allow different parameters for deviation from the guidance line according to pricing segment, type of part, or type of competitor.

The pricing tool may further allow users, such as OEMs, to determine the correct margin to use (OEM or dealer margin). Several features and functionalities may allow determination of the right margin level overall, as well as distribution of the margin level across part numbers. The pricing platform may allow management of minimum margins for an OEM where manufacturing or supplier sourcing costs are high. The pricing platform may also allow management of suggested dealer margins, which may be the difference between a recommended retail price (RRP) and a dealer net price (DNP). For example, when pricing rules are applied to parts on a recommended retail price level and pricing rules are also applied to parts on a dealer net price level, the resulting dealer margins on a part number level may be dishomogeneous. The pricing platform may allow an analysis of all resulting margin levels within a group of parts and may facilitate setting a single margin level for each group. Furthermore the pricing platform may facilitate implementing rule-based decisions on how to apply a harmonized margin and create minimal disruption to other pricing rules. Since changes in parts prices may lead to changes in margins, the pricing tool may facilitate easy manipulation of margins based on rules and algorithms.

Figure 8:
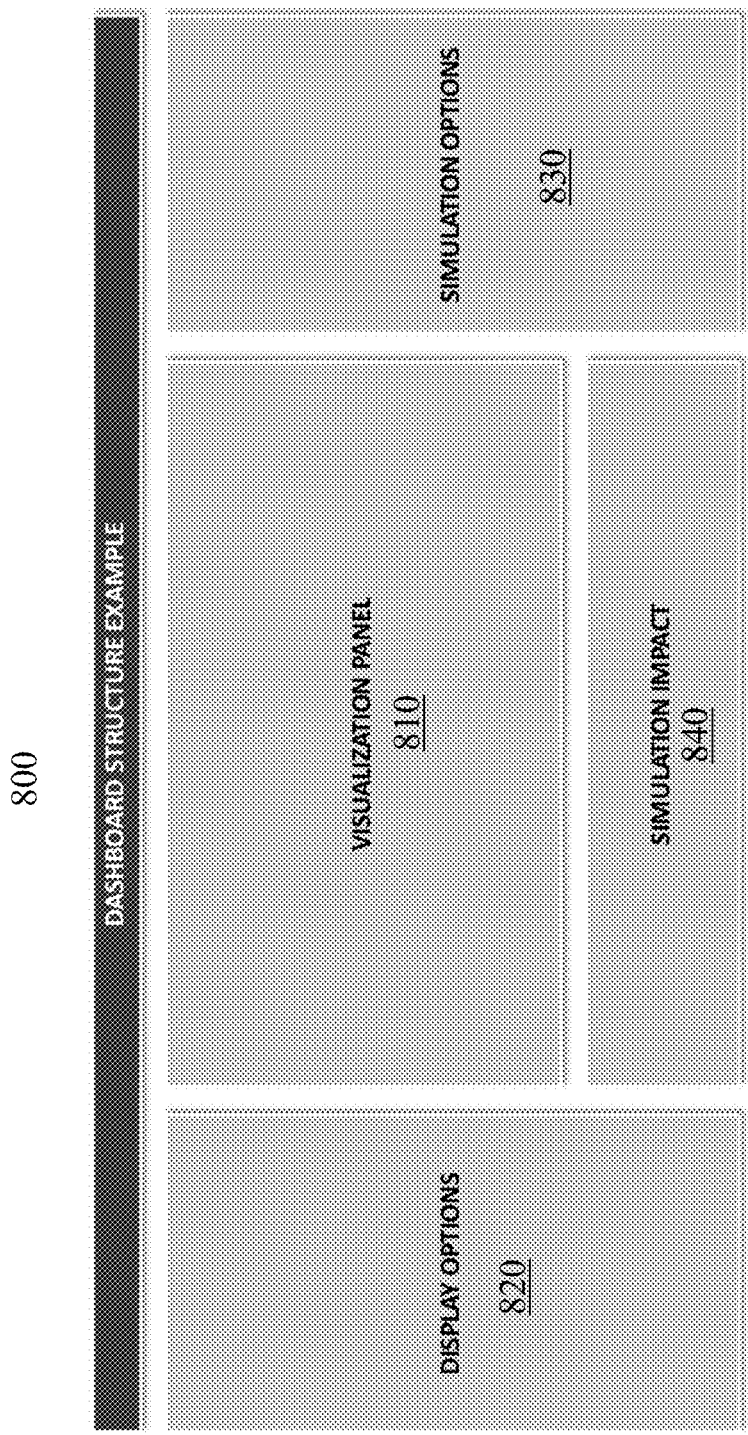
FIG. 8 shows a pricing engine dashboard.

Now referring to exemplary FIG. 8, the pricing tool may implement a dashboard for automatically generating, presenting, interacting with, and manipulating data according to user input. For each country, relevant information and data may be displayed in a user-friendly interface or dashboard. The relevant information and data may optionally include current and future price position, sales, guidance line position, shifted guidance line position, pricing rules, benchmark prices, and other information and data as would be understood by a person having ordinary skill in the art. The dashboard may also be operable as a simulation hub, where pricing rules may be defined, changed and compared. Different scenarios and simulations may be saved and loaded through the dashboard. The dashboard may further display the financial impact of each scenarios. As shown in FIG. 8, an exemplary embodiment of a dashboard 800 may include a visualization panel 810, display options 820, simulation options 830, and simulation impact 840. The visualization panel 810 may be a portion of the interface where all data may be plotted and graphed. The display options panel 820 may allow a user to show or hide data in the visualization panel 810. The data may, for example, include price level, sales, benchmark prices, etc. The simulation options panel 830 may allow a user to input, select or otherwise define pricing rules and scenarios. The simulation impact panel 840 may provide the output of a simulation, which may optionally include the financial impact, price position, etc.

Figure 9:
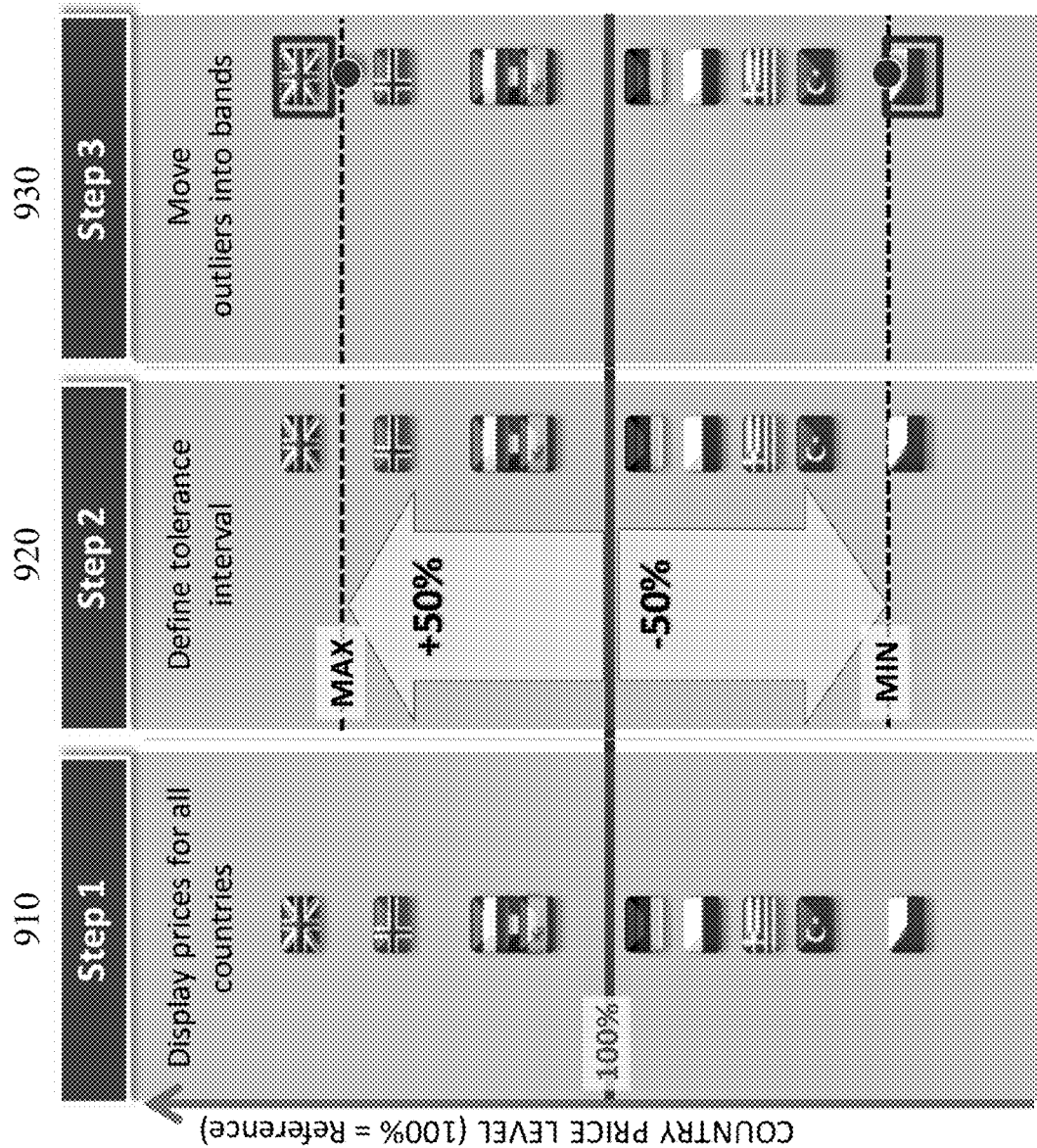
FIG. 9 shows a pricing engine control framework.

Now referring to exemplary FIG. 9, a control framework may be provided. Since parts for each country may be priced independently, a control framework may provide a platform and mechanism for ensuring that the price for the same part number does not vary undesirably from one country to another. Large or undesirable price differences across countries may result in customer dissatisfaction as well as arbitrage opportunities. The control framework may provide the simultaneous display of prices for all countries on a single chart 910. The control framework may further provide for the definition of tolerance bands or thresholds that may prevent the price of a part in one country from being too high or too low compared to other countries 920. A tolerance interval may be defined from an anchor, or reference point. The anchor or reference point may optionally be an average price across countries, a minimum price across countries, a maximum price across countries, a price in one specific country, the guidance line, an arbitrary or theoretical price, or other reference as would be understood by a person having ordinary skill in the art. According to an exemplary embodiment, the tolerance interval may optionally differ by pricing segment. If a part price is outside of the tolerance interval set by the control framework, the price may automatically be adjusted by the control framework 900 to the closest possible value within the tolerance interval 930.

According to further exemplary embodiments, the pricing tool may facilitate managing the speed at which price changes take place over time, based on the pricing rules selected. Once a set of rules and a future target price position have been set, the tool can simulate a migration over time. If a future target price position is "far" away from a current price position, it may be possible to simulate the impact of smaller intermediate steps (for example, no price change on a single date in time should exceed plus or minus 30%) as well as the impact of a final price position. In this way the tool may generate simulation over time, calculation of the financial impact for the final target price position, as well as the intermediate steps.

The pricing tool may further reconcile overall results utilizing a feedback loop. When carrying out the repricing process across several countries, the tool may check that the overall results of the simulation reconcile with the selected scenario and pricing rules. In other words, the tool may ensure that the overall financials are acceptable, that the price differences across countries are an acceptable tradeoff, and other aspects of the repricing meet desired objectives. A feedback loop may be implemented so that the simulation for each country may be updated based on overall simulation results. For example, pricing in one country may be further increased to bridge a gap with another country or pricing may be further adjusted to harvest the full potential in one country to offset loss in another country.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A non-transitory computer-readable medium for pricing parts, comprising instructions stored thereon, that, when executed on a processor, perform the steps of:
   accessing part data stored in a database, the part data having at least one of internal part data and external part data;
   setting or adjusting an initial price;
   segmenting parts into unique competitive segments using a segmentation logic;
   applying a pricing rule to set a target price for at least one of an individual part, a parts segment, and all parts;
   creating a guidance line for a segment, wherein the guidance line comprises current or target price positions for individual parts;
   shifting the guidance line for a segment according to the pricing rule to create a shifted guidance line;
   establishing the target prices for a segment according to the shifted guidance line;
   implementing a control framework establishing a tolerance band for a particular part defining a maximum pricing deviation for the particular part's country specific prices from the target price, wherein pricing is performed on a country specific basis and wherein the control framework tolerance band sets a maximum price deviation for an individual part across multiple countries;
   automatically adjusting target prices outside of the tolerance band according to the control framework to be within the tolerance band, wherein the control framework further establishes a price change speed threshold defining a maximum change over a set duration, and wherein the automatic adjustment of prices is implemented according to the speed threshold;
   automatically and continuously implementing a feedback loop for running additional simulations updating individual country pricing based on pricing results across all countries;
   generating a report for presenting the financial impact of the pricing; and
   creating a rule book file defining parameters used in the pricing, wherein the rule book file comprises a pricing algorithm performed in a pricing simulation.

2. The non-transitory computer-readable medium of claim 1, wherein the guidance line for a segment maintains a constant shape when shifted.

3. The non-transitory computer-readable medium of claim 1, wherein the tolerance band differs by segment.

4. The non-transitory computer-readable medium of claim 1, further comprising applying a sell-in scoring algorithm to each part to identify a sell-in segment; applying a sell-out scoring algorithm to each part to identify a sell-out segment; and applying a reconciliation algorithm for each part to identify a final segment.

5. The non-transitory computer-readable medium of claim 4, further comprising applying a special parts filter to separate special parts from a remaining parts pool for segmentation.

6. The non-transitory computer-readable medium of claim 1, wherein the internal data comprises at least one of sales, price, cost, age, supplier, vehicle application, exterior dimensions, weight, and technical features and characteristics, and wherein the external data comprises a at least one of competitor prices, peer prices, market share, and variables describing a level of competition.

7. The non-transitory computer-readable medium of claim 1, further comprising displaying the guidance line through a user interface, wherein the guidance line display provides visualization of a relationship between two or more of parts, prices, costs, and competition, and wherein the guidance line is manipulatable by the user interface.

8. A method for pricing parts comprising:
   accessing at least one of internal data and external data stored in a database;

setting or adjusting an initial price;

segmenting parts into unique competitive segments using a segmentation logic;

applying a pricing rule to set a target price for at least one of an individual part, a parts segment, and all parts;

creating a guidance line for a segment, wherein the guidance line comprises current or target price positions for individual parts;

shifting the guidance line for a segment according to the pricing rule to create a shifted guidance line;

establishing the target prices for a segment according to the shifted guidance line;

implementing a control framework establishing a tolerance band for a particular part defining a maximum pricing deviation for the particular part's country specific prices from the target price, wherein pricing is performed on a country specific basis and wherein the control framework tolerance band sets a maximum price deviation for an individual part across multiple countries;

automatically adjusting target prices outside of the tolerance band according to the control framework to be within the tolerance band, wherein the control framework further establishes a price change speed threshold defining a maximum change over a set duration, and wherein the automatic adjustment of prices is implemented according to the speed threshold;

automatically and continuously implementing a feedback loop for running additional simulations updating individual country pricing based on pricing results across all countries;

generating a report for presenting the financial impact of the pricing; and generating a rule book file defining parameters used in the pricing, wherein the rule book file comprises a pricing algorithm performed in a pricing simulation.

9. The method of claim 8, wherein the guidance line for a segment maintains a constant shape when shifted.

10. The method of claim 8, wherein the tolerance band differs by segment.

11. The method of claim 8, further comprising applying a sell-in scoring algorithm to each part to identify a sell-in segment; applying a sell-out scoring algorithm to each part to identify a sell-out segment; and applying a reconciliation algorithm for each part to identify a final segment.

12. The method of claim 11, further comprising applying a special parts filter to separate special parts from a remaining parts pool for segmentation.

13. The method of claim 8, wherein the internal data comprises at least one of sales, price, cost, age, supplier, vehicle application, exterior dimensions, weight, and technical features and characteristics, and wherein the external data comprises at least one of competitor prices, peer prices, market share, and variables describing a level of competition.

14. The method of claim 8, further comprising displaying the guidance line through a user interface, wherein the guidance line display provides visualization of a relationship between two or more of parts, prices, costs, and competition, and wherein the guidance line is manipulatable by the user interface.

* * * * *